United States Patent
Read

(10) Patent No.: US 7,751,436 B2
(45) Date of Patent: Jul. 6, 2010

(54) SYSTEM AND METHOD FOR DYNAMICALLY ESTABLISHING PLL SPEED BASED ON RECEIVE BUFFER DATA ACCUMULATION FOR STREAMING VIDEO

(75) Inventor: Christopher Jensen Read, San Diego, CA (US)

(73) Assignees: Sony Corporation, Tokyo (JP); Sony Electronics Inc., Park Rdige, NJ (US)

(*) Notice: Subject to any disclaimer, the term of this patent is extended or adjusted under 35 U.S.C. 154(b) by 896 days.

(21) Appl. No.: 11/136,199

(22) Filed: May 24, 2005

(65) Prior Publication Data

US 2006/0268912 A1 Nov. 30, 2006

(51) Int. Cl.
*H04J 3/22* (2006.01)

(52) U.S. Cl. ............... 370/468; 370/235; 370/477; 725/90; 725/94; 725/95; 709/232; 709/233; 348/387.1; 348/390.1

(58) Field of Classification Search ............... 370/230, 370/235, 236, 389, 545; 725/68, 71, 85, 725/100, 110, 131, 139, 151, 90, 94; 327/147, 327/156; 348/516, 536, 537; 710/57
See application file for complete search history.

(56) References Cited

U.S. PATENT DOCUMENTS

| | | | |
|---|---|---|---|
| 4,231,071 A | 10/1980 | Anderson | |
| 4,814,726 A | 3/1989 | Byrd | 331/1 A |
| 5,003,562 A | 3/1991 | Van Driest | 375/119 |
| 5,255,291 A | 10/1993 | Holden et al. | 375/111 |
| 5,327,430 A | 7/1994 | Urbansky | 370/84 |
| 5,329,559 A | 7/1994 | Wong | 375/119 |
| 5,351,274 A | 9/1994 | Chennakeshu | 375/100 |
| 5,396,497 A * | 3/1995 | Veltman | 375/240.25 |
| 5,473,385 A | 12/1995 | Leske | 348/500 |
| 5,473,665 A | 12/1995 | Hall | 379/29 |
| 5,544,324 A | 8/1996 | Edem et al. | 395/200.17 |
| 5,566,169 A | 10/1996 | Rangan et al. | 370/56 |
| 5,652,627 A | 7/1997 | Allen | 348/497 |
| 5,661,778 A | 8/1997 | Hall | 379/29 |
| 5,754,241 A * | 5/1998 | Okada et al. | 375/240.05 |
| 5,774,292 A | 6/1998 | Georgiou | 360/73.03 |
| 5,805,597 A | 9/1998 | Edem | 370/445 |
| 5,943,490 A | 8/1999 | Sample | 395/500.49 |
| 5,949,795 A * | 9/1999 | Moroney et al. | 370/516 |
| 5,960,191 A | 9/1999 | Sample | 395/500.49 |
| 6,044,124 A | 3/2000 | Monahan | 375/376 |
| 6,055,270 A * | 4/2000 | Ozkan et al. | 375/240.03 |
| 6,072,832 A * | 6/2000 | Katto | 375/240.28 |

(Continued)

OTHER PUBLICATIONS

Rayel, Set Top Box Decoders Process MPEG-2 and Offload the CPU, Jan. 8, 2003, Planet Analog.*

(Continued)

*Primary Examiner*—Aung S Moe
*Assistant Examiner*—Hoon J Chung
(74) *Attorney, Agent, or Firm*—John L. Rogitz

(57) ABSTRACT

The decode rate of an MPEG decoder of streaming video is set to a relatively slow value at the start of a stream to permit playing, albeit at relatively low speeds, of the video until an appropriate number of packets are in a receive buffer, at which time the decode rate is speeded up to normal.

13 Claims, 2 Drawing Sheets

U.S. PATENT DOCUMENTS

| | | |
|---|---|---|
| 6,215,789 B1 | 4/2001 | Keenan et al. ............... 370/399 |
| 6,233,226 B1 | 5/2001 | Gringeri et al. ............. 370/252 |
| 6,236,278 B1 | 5/2001 | Olgaard ........................ 331/25 |
| 6,377,912 B1 | 4/2002 | Sample ......................... 703/28 |
| 6,574,242 B1 | 6/2003 | Keenan et al. ............... 370/474 |
| 6,577,631 B1 | 6/2003 | Keenan et al. ............... 370/394 |
| 6,665,751 B1 * | 12/2003 | Chen et al. .................... 710/52 |
| 6,694,464 B1 | 2/2004 | Quayle ......................... 714/725 |
| 6,732,068 B2 | 5/2004 | Sample et al. ................ 703/24 |
| 6,741,109 B1 | 5/2004 | Huang ......................... 327/156 |
| 6,765,424 B2 | 7/2004 | Zampetti ..................... 327/292 |
| 6,876,242 B2 | 4/2005 | Zampetti ..................... 327/292 |
| 7,373,413 B1 * | 5/2008 | Nguyen et al. .............. 709/231 |
| 2002/0154640 A1 * | 10/2002 | Wei ............................. 370/401 |
| 2004/0005004 A1 * | 1/2004 | Demos .................. 375/240.08 |

OTHER PUBLICATIONS

Walker et al., Mobile Video-Streaming, Jul. 2003, BT Technology Journal, vol. 21, No. 3, p. 192-p. 202.*

* cited by examiner

SYSTEM AND METHOD FOR DYNAMICALLY ESTABLISHING PLL SPEED BASED ON RECEIVE BUFFER DATA ACCUMULATION FOR STREAMING VIDEO

I. FIELD OF THE INVENTION

The present invention relates generally to streaming video such as streaming MPEG video.

II. BACKGROUND OF THE INVENTION

Streaming video has been introduced in which video, typically in an MPEG format, is "streamed" in packets from a source such as an Internet site to a receiver such as a user's computer. The video is played as it is being received. Because streaming video networks can experience packet delivery jitter, meaning that the rate at which the packets is received can vary, packets ordinarily are buffered at a receiver until a sufficient number of packets have arrived to permit decoding and playing the packets in a relatively smooth, glitch-free manner.

As recognized herein, this buffering of packets causes an undesirable delay in presentation at the start of the stream, as presentation is held in abeyance until sufficient packets exist in the buffer to more or less ensure a glitch-free, smooth decode and play process. The present invention understands that simply giving a user the option of establishing a relatively low amount of data that must be present in the buffer before presentation commences, while increasing system responsiveness, also increases the risk of glitches during display, since the buffer can empty during play in the presence of network latency relatively sooner than it otherwise would. In other words, allowing a user to make the responsiveness/glitch-free tradeoff, and then maintaining the user-defined buffer amount for all subsequent streaming operations until such time as the user might alter it, leads to less than optimum results. Having made these critical observations, the invention herein is provided.

SUMMARY OF THE INVENTION

A streaming video receiver includes a decoder that decodes video packets at a decode rate. A receive buffer in the receiver stores video packets before sending the packets to the decoder. According to the present invention, the receiver executes logic to dynamically establish the decode rate based on an amount of data in the buffer.

In some implementations the decoder may receive the decode rate from a phase-locked loop (PLL). The decoder can be an MPEG decoder. The logic that is executed by the receiver can establish a first decode rate if the amount of data in the buffer does not meet a threshold, and can establish a second decode rate faster than the first decode rate if the amount of data in the buffer meets the threshold. To do this, in some implementations the logic controls the PLL to output the decode rate to the decoder. The first decode rate may be established automatically upon initially receiving the video stream.

In another aspect, a streaming video system includes a receiver buffer storing packets of a video stream, and an MPEG decoder receiving packets from the buffer at a decode rate. The system also includes a PLL that outputs a signal representing the decode rate to the decoder. Specifically, the PLL outputs a signal representative of a first decode rate at or near the beginning of receiving the video stream, with the PLL automatically being altered to output a second decode rate faster than the first decode rate based on an amount of data in the buffer.

In still another aspect, a method for video decoding includes receiving a video stream, and establishing a slow decode rate at the beginning of the stream. Then, the method includes establishing a normal decode rate based on an amount of buffered data.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
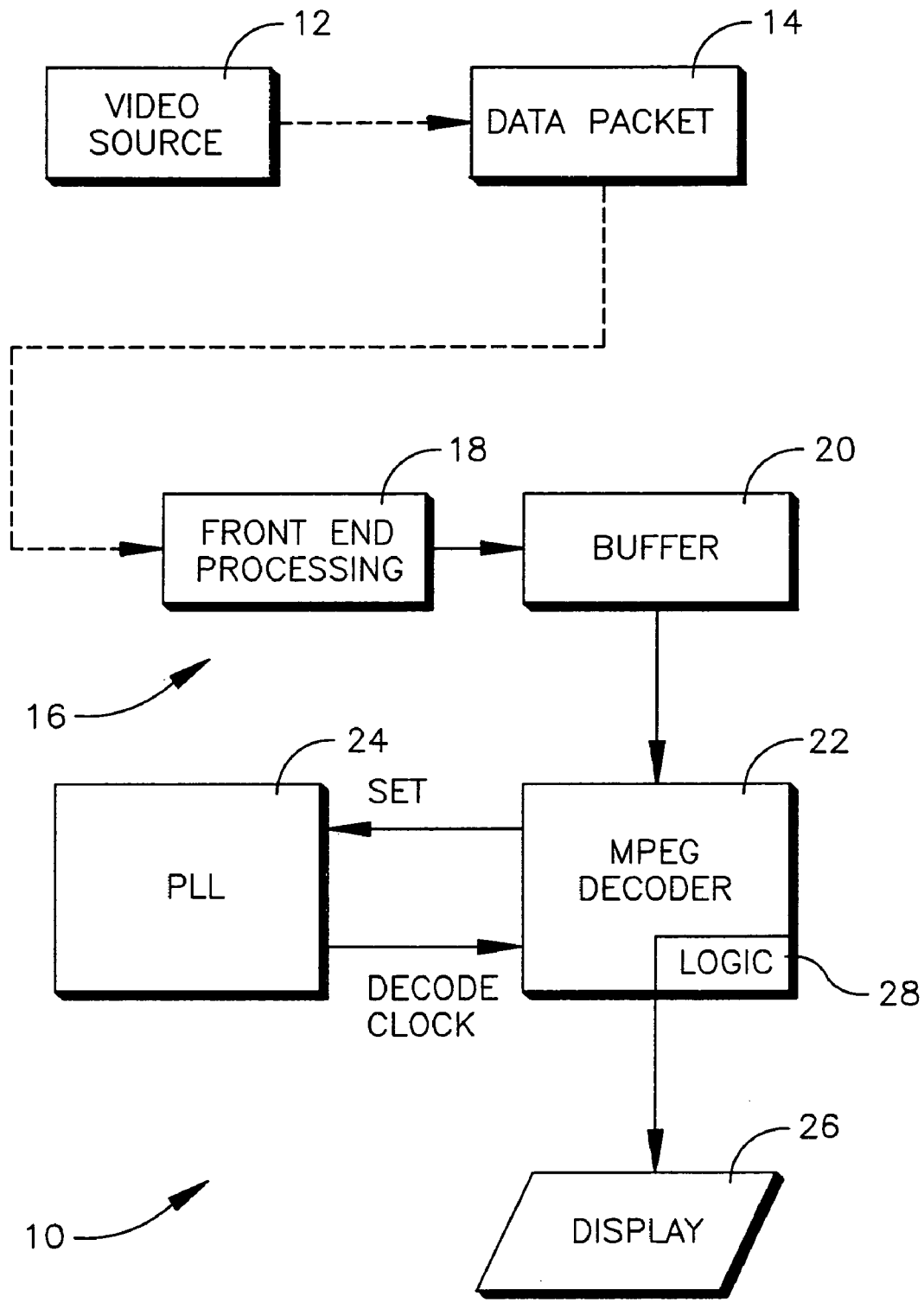
FIG. 1 is a block diagram of one non-limiting implementation of the system.

Referring initially to FIG. 1, a streaming video system is shown, generally designated 10, having one or more sources 12 of streaming video packets 14 and one or more receivers 16. A streaming video source may be any suitable source such as a Web site, broadcast, or other source preferably of packetized video streams that may be encoded in an MPEG format. Broadcast transport streams may use PCR information sent with the packets, with the PCR information indicating the rate of encoding the video at the source 12, although streaming video may not use PCR values owing to high jitter. While the present invention is directed (albeit not exclusively) to streaming video, PCR nonetheless is mentioned because the PLL that can be used in accordance with present principles can be the same PLL that otherwise would use PCR values in the decoding of broadcast transport streams.

FIG. 1 shows that the receiver 16 includes front-end processing in accordance with principles known in the art which outputs video packets to a buffer 20 for temporary storage. Data from the buffer 20 is sent to a decoder 22 at a decode rate that is dictated by a clocking mechanism, such as a phase-locked loop (PLL) 24 that otherwise could use PCR values when they are provided for, e.g., decoding non-streaming video. In other words, the PLL 24 is used to decode broadcast transport streams in addition to streaming video, with the PLL receiving PCR values in broadcast transport (non-streaming video) streams. In any case, decoded video is displayed on a display 26.

The receiver 16 includes a logic mechanism 28 for controlling the clocking mechanism to dynamically establish the decode rate based on the amount of data in the buffer. The logic mechanism can be a processor in the receiver, such as a core processor associated with the decoder 22, although the location and precise nature of the logic mechanism is not limiting beyond the logic it executes. The logic mechanism 28, as the skilled artisan will readily understand, can include a processor proper and memory for storing executable code or circuitry embodying the logic shown in FIG. 2. Or, the logic mechanism 28 may not include a digital processing unit per se but may be an analog or digital circuit that embodies the logic of FIG. 2.

Figure 2:
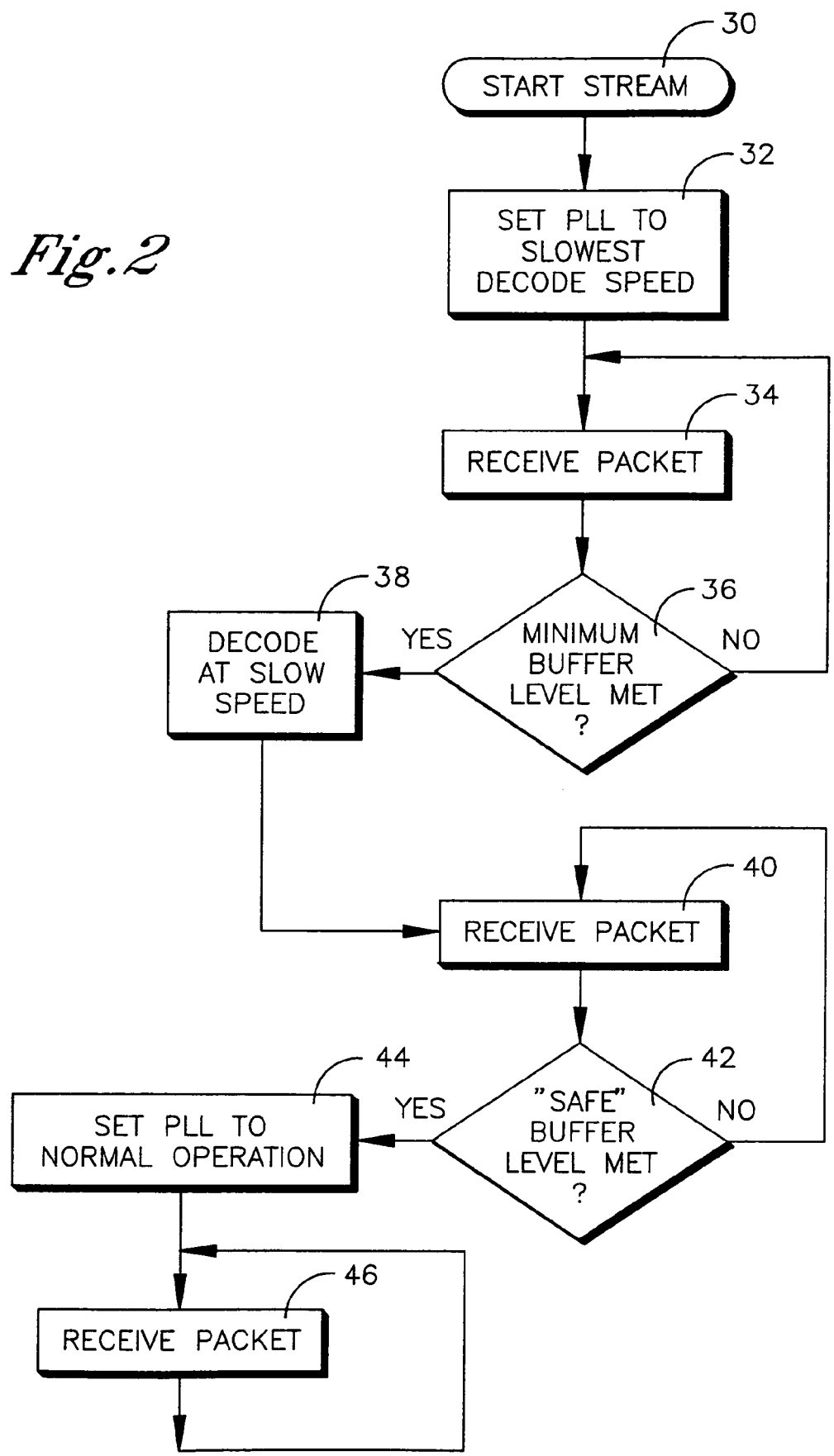
FIG. 2 is a flow chart of a non-limiting implementation of the logic.

Now referring to FIG. 2, the logic commences at state 30 every time a new video stream is received, the logic being undertaken for that video stream. As indicated at block 32, when the stream is initially received, the decode rate used by the decoder 22 is set to a slow speed. While the "slow" speed is indeed slower than the normal rate, in practical implementations its "slowness" is virtually imperceptible to the viewer. The "slow" speed can be established by configuring the PLL 24 to output, e.g., its lowest decode rate to the decoder 22. While in one implementation a PLL is used to set the decode rate, it is to be understood that other clock mechanisms related to decode rate can be used.

Block 34 indicates that with the decode rate set to "slow" at the initiation of video stream reception, a video packet (or other unit of video) is received. Recognizing that decoding even at a slow rate cannot proceed until some minimum amount of data has been buffered, at decision diamond 36 it is determined whether this minimum amount, e.g., a few percent of the capacity of the buffer, has been met. It is to be understood that "amount" of data could refer to the size in bits or bytes of buffered data or to the number of packets in the buffer or to other relevant data amount metrics.

If the minimum amount is not met, the logic loops back to block 34, but when the minimum amount is met, decoding (and thus presentation) of the video commences at block 38 at the "slow" decode rate. The logic continues to block 40 to receive another packet in the stream.

At decision diamond 42 another buffer level determination is made, this time to ascertain whether the amount of data in the buffer meets an amount threshold (referred to in FIG. 2 as a "safe" threshold) that is higher than the "minimum" threshold of decision diamond 36. The "safe" threshold may be, e.g., ten percent or higher of the total capacity of the buffer. Regardless of the numerical value of the threshold, which may be empirically determined and optimized, if the test at decision diamond 42 is negative the logic loops back to block 40, but otherwise the logic proceeds to block 44 to increase the decode rate. When the PLL 24 is used as the mechanism for establishing the decode rate of the decoder 22, the PLL is set to output a higher decode rate, e.g., the rate at which video normally is decoded for viewing. The remaining packets in the stream are then received at block 46.

It is to be understood that the shift from the slow decode rate to the normal decode rate may be instantaneous or it may be gradual. For instance, if the difference between the two rates is large, the decode rate can be increased incrementally over a short period. By way of non-limiting example, the operation at block 44 could be executed by incrementally raising the decode rate by ten percent of the increase every few milliseconds until the normal rate is attained.

While for ease of exposition FIG. 2 is shown in flow chart form, it is to be understood that the logic as implemented may be, e.g., state logic or other appropriate logic structure.

While the particular SYSTEM AND METHOD FOR DYNAMICALLY ESTABLISHING PLL SPEED BASED ON RECEIVE BUFFER DATA ACCUMULATION FOR STREAMING VIDEO as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A receiver receiving data, the data being streaming data in that it is streamed to the receiver for being decoded in real time as it is received, the receiver comprising:
 a decoder decoding packets at a decode rate;
 a buffer storing at least some of the packets before sending the packets to the decoder; wherein
 the receiver executes logic to dynamically establish the decode rate based on an amount of data in the buffer, wherein decoding is not permitted at the initiation of streaming data reception until a predetermined minimum amount of data has been buffered, and in response to a determination by the receiver that the predetermined minimum amount of data has been buffered, the decode rate is always set by the receiver to a rate slower than a normal decode rate of thirty two frames per second for the data and data decoding is commenced, and the decode rate is increased to the normal decode rate solely in response to a determination by the receiver that data in the buffer reaches a threshold higher than the predetermined minimum amount of data, wherein the decoder receives the decode rate from a phase-locked loop (PLL).

2. The receiver of claim 1, wherein the decoder includes an MPEG decoder.

3. The receiver of claim 1, wherein the PLL normally receives program clock reference (PCR) values in broadcast transport streams.

4. A streaming data system, comprising:
 a buffer storing packets of a data stream;
 decoder receiving packets from the buffer at a decode rate;
 a timing element outputting a signal representative of the decode rate to the decoder, the timing element outputting a signal representative of a first decode rate upon initially receiving the data stream, the timing element automatically being altered to output a second decode rate faster than the first decode rate based on an amount of data in the buffer exceeding a predetermined minimum amount, the second decode rate being faster than the first decode rate, the timing element automatically being altered to output a third decode rate based on an amount of data in the buffer exceeding a predetermined safe amount, the predetermined safe amount being greater than the predetermined minimum amount, the timing element including a phase locked loop (PLL), wherein the first decode rate is established if a first amount of data in the buffer does not meet a threshold, the second decode rate being faster than the first decode rate and being established if the first amount of data in the buffer meets the threshold.

5. The system of claim 4, wherein the first decode rate is established automatically upon initially receiving the data stream.

6. The system of claim 4, wherein the PLL is used to decode broadcast transport streams in addition to streaming video, the PLL receiving PCR values in broadcast transport streams.

7. The system of claim 4, wherein the second decode rate is established incrementally.

8. A method for decoding, comprising:
 receiving a stream at a computerized receiver;

using the computerized receiver, establishing, based on signals from a phase locked loop (PLL), a slow decode rate less than thirty two frames per second at the beginning of the stream;

in response to a determination that a buffer in the receiver contains a minimum amount of data greater than zero, decoding video at the slow decode rate until a determination is made that an amount of data in the buffer meets a safe threshold, the safe threshold being greater than the minimum amount;

in response to a determination that data in the buffer meets the safe threshold, speeding up a decode rate to a first rate exceeding the slow decode rate.

9. The method of claim 8, wherein a normal decode rate is established when an amount of data in the buffer receiving the stream meets a first threshold.

10. The method of claim 9, comprising decoding the stream at the slow decode rate only if an amount of data in the buffer meets a second threshold less than the first threshold.

11. The method of claim 8, wherein the stream is decoded by an MPEG decoder receiving decode rate signals from the PLL.

12. The method of claim 11, wherein the PLL is used to decode broadcast transport streams in addition to streaming video, the PLL receiving PCR values in broadcast transport streams.

13. The method of claim 8, wherein a normal decode rate is established incrementally.

* * * * *